(12) United States Patent
Shirai et al.

(10) Patent No.: US 8,228,788 B2
(45) Date of Patent: Jul. 24, 2012

(54) NETWORK CONNECTION DEVICE AND SIGNAL PROCESSING METHOD IN THE NETWORK CONNECTION DEVICE

(75) Inventors: Katsuhiro Shirai, Kawasaki (JP); Junichi Moriyama, Numazu (JP)

(73) Assignee: Fujitsu Limited, Kawasaki (JP)

( * ) Notice: Subject to any disclaimer, the term of this patent is extended or adjusted under 35 U.S.C. 154(b) by 128 days.

(21) Appl. No.: 12/411,868

(22) Filed: Mar. 26, 2009

(65) Prior Publication Data

US 2009/0245782 A1    Oct. 1, 2009

(30) Foreign Application Priority Data

Mar. 28, 2008   (JP) .................................. 2008-088338

(51) Int. Cl.
*H04L 12/28* (2006.01)
*G02F 1/00* (2006.01)

(52) U.S. Cl. .............................. 370/222; 370/410; 398/1

(58) Field of Classification Search .................. 370/222, 370/242, 328, 352, 389, 395.1, 400, 410, 370/406; 398/1, 20, 33, 43, 45, 46, 79
See application file for complete search history.

(56) References Cited

U.S. PATENT DOCUMENTS

| | | | | |
|---|---|---|---|---|
| 5,568,487 A * | 10/1996 | Sitbon et al. | .................. | 370/466 |
| 5,841,764 A * | 11/1998 | Roderique et al. | ............ | 370/310 |
| 6,957,271 B1 * | 10/2005 | Shimada | ........................ | 709/238 |
| 2004/0136389 A1 * | 7/2004 | Hunneyball | ................... | 370/406 |
| 2006/0126662 A1 * | 6/2006 | Huang | ............................ | 370/469 |
| 2007/0081466 A1 * | 4/2007 | Tsukamoto | ..................... | 370/242 |
| 2007/0248004 A1 * | 10/2007 | Shimizu | ........................ | 370/222 |

FOREIGN PATENT DOCUMENTS

| | | |
|---|---|---|
| JP | 2004-524784 | 8/2004 |
| WO | WO02/089401 | 11/2002 |

OTHER PUBLICATIONS

Japanese Office Action mailed Mar. 6, 2012 issued in corresponding Japanese Patent Application No. 2008-088338.

* cited by examiner

*Primary Examiner* — Chi Pham
*Assistant Examiner* — Prince A Mensah
(74) *Attorney, Agent, or Firm* — Staas & Halsey LLP

(57) ABSTRACT

A network connection device for performing a process of transmitting and receiving a SONET/SDH frame includes a first protocol processor which processes a first network management protocol; a second protocol processor which processes a second network management protocol; a frame header extractor which extracts a header from the received SONET/SDH frame; and a protocol identifier which identifies a network management protocol based on the extracted frame header. The network connection device selects one of a control signal outputted from the first protocol processor and a control signal outputted from the second protocol processor based on a result of the identification, and outputs the control signal.

9 Claims, 13 Drawing Sheets

FIG. 10

| GATEWAY DEVICE 50A2 | |
|---|---|
| PORT | PROTOCOL |
| P1 | PPP |
| P2 | PPP |
| P3 | PPP |
| P4 | PPP |

| GATEWAY DEVICE 60A1 | |
|---|---|
| PORT | PROTOCOL |
| P5 | LAPD |
| P6 | LAPD |
| P7 | PPP |
| P8 | LAPD |

| GATEWAY DEVICE 70A1 | |
|---|---|
| PORT | PROTOCOL |
| P9 | LAPD |
| P10 | LAPD |
| P11 | PPP |
| P12 | LAPD |

NETWORK CONNECTION DEVICE AND SIGNAL PROCESSING METHOD IN THE NETWORK CONNECTION DEVICE

CROSS-REFERENCE TO RELATED APPLICATIONS

This application is based upon and claims the benefit of priority of the prior Japanese Patent Application No. 2008-88338, filed on Mar. 28, 2008, the entire contents of which are incorporated herein by reference.

BACKGROUND

1. Field

The embodiments discussed herein are related to a network connection device which performs data transmission and reception processing and a signal processing method in the device.

2. Description of the Related Art

Conventional methods for managing a SONET/SDH (Synchronous Optical Network/Synchronous Digital Hierarchy) communication network include supporting GMPLS (Generalized Multi-Protocol Label Switching) and supporting OSI (Open Systems Interconnection). Some communication protocols are used in combination in the entire network.

Such a SONET/SDH communication network is managed by a piece of monitor and control equipment called an NMS (Network Management System).

At this time, a SDCC (Section Data Communication Channel) prepared in a section overhead of a SONET/SDH frame is used for communication between an NMS and a transmission device and communication between transmission devices.

A protocol used in a SDCC depends on whether a transmission device supports GMPLS or OSI. A TCP/IP protocol is used between transmission devices supporting GMPLS while an OSI protocol is used between transmission devices supporting OSI.

A protocol used by a transmission device serving as an object to be monitored and controlled needs to be used in a control signal to be transmitted by an NMS.

Accordingly, an NMS needs to be installed for each network group in which a common protocol is used in order to manage, e.g., the whole of a network where networks to which GMPLS-based management is applied and networks to which OSI-based management is applied are mixed. In this case, installation of NMSs entails a lot of costs and requires administrators for operating the NMSs to be stationed.

Japanese Laid-open Patent Publication No. 2004-524784 discloses an OSI tunnel which encapsulates an IP packet in an OSI packet and allows the OSI packet to pass through a DCN (Data Communication Network) supporting OSI.

The OSI tunnel makes it possible to monitor and control transmission devices supporting GMPLS by one NMS. The reduction in the number of NMSs leads to a reduction in costs and workforce.

SUMMARY

According to an aspect of the invention, a network connection device for performing a process of transmitting and receiving a SONET/SDH frame comprises a first protocol processor which processes a first network management protocol; a second protocol processor which processes a second network management protocol; a frame header extractor which extracts a header from the received SONET/SDH frame; and a protocol identifier which identifies a network management protocol based on the extracted frame header, selects one of a control signal outputted from the first protocol processor and a control signal outputted from the second protocol processor based on a result of the identification, and outputs the control signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

The above-described embodiments of the present invention are intended as examples, and all embodiments of the present invention are not limited to including the features described above.

BRIEF DESCRIPTION OF THE DRAWINGS

FIG. 7 is a flow chart for explaining a processing operation of a LAPD control unit 160a;

FIG. 10 is a chart showing examples of pieces of information stored by protocol management units;

DETAILED DESCRIPTION OF THE PREFERRED EMBODIMENTS

Figure 1:
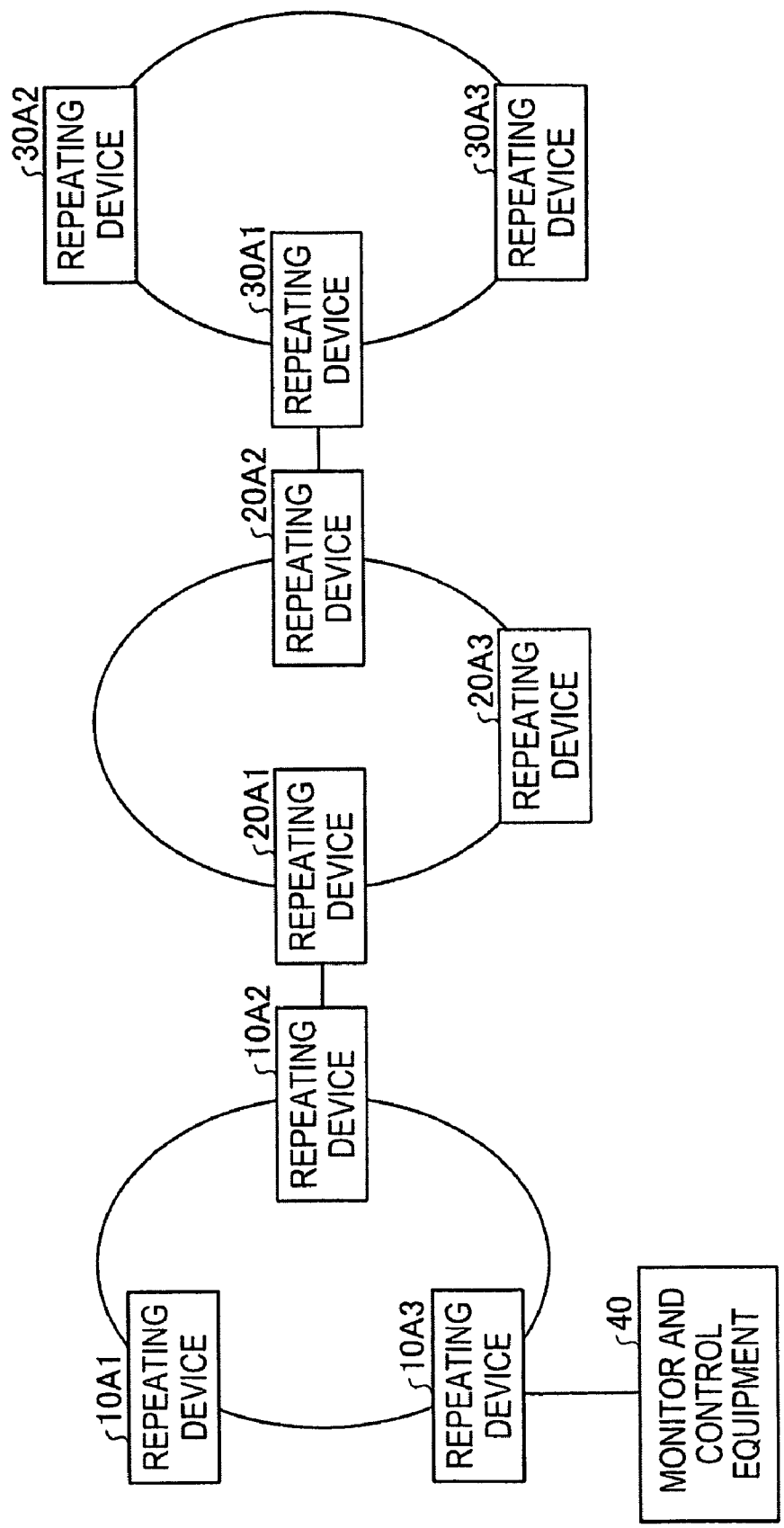
FIG. 1 is a diagram showing an example of a network serving as an object to be monitored and controlled.

Reference may now be made in detail to embodiments of the present invention, examples of which are illustrated in the accompanying drawings, wherein like reference numerals refer to like elements throughout.

Use of an OSI tunnel technique suffers from problems such as the cumbersomeness of work required for OSI tunnel setting and the danger of incorrect setting. Additionally, monitoring and control of a transmission device supporting OSI needs to be performed by another NMS, which leaves room for a reduction in costs and/or workforce.

Therefore, there is a need for a method capable of easily managing the whole of a SONET/SDH communication network in a centralized manner by one piece of monitor and control equipment.

Preferred embodiments of a network connection device and a gateway device according to the present invention will be described in detail below with reference to the accompanying drawings.

First Embodiment

FIG. 1 is a diagram showing an example of a network serving as an object to be monitored and controlled. As shown in FIG. 1, the network is configured such that a first network composed of repeating devices 10A1 to 10A3, a second network composed of repeating devices 20A1 to 20A3, and a third network composed of repeating devices 30A1 to 30A3 are connected.

Any of the first to third networks is a network constructed in conformity with SONET/SDH. The first and third networks support GMPLS while the second network supports OSI.

A SDCC (Section Data Communication Channel) prepared in a section overhead of a SONET/SDH frame is used for communication between repeating devices in the above-described network.

However, the first to third networks use different protocols for communication between repeating devices.

In other words, a TCP/IP protocol is used for communication among the repeating devices 10A1 to 10A3 supporting GMPLS and communication among the repeating devices 30A1 to 30A3, while an OSI protocol is used for communication among the repeating devices 20A1 to 20A3.

As described above, a different protocol is used for communication in each small-scale network. Accordingly, conventional management of the whole network requires installment of a piece of monitor and control equipment for each small-scale network.

There is also available a method of managing the first and third networks supporting GMPLS in a centralized manner by means of one piece of monitor and control equipment by setting an OSI tunnel between the repeating device 20A1 and the repeating device 20A2. However, the setting of the OSI tunnel requires cumbersome work.

For this reason, all repeating devices within the network shown in FIG. 1 are each equipped with a network connection device according to this embodiment such that one piece of monitor and control equipment 40 can manage the whole network in a centralized manner without cumbersome work such as setting an OSI tunnel.

More specifically, each repeating device is enabled to communicate both of an OSI control signal (LAPD) and a GMPLS control signal (PPP) on a SDCC. Accordingly, the piece of monitor and control equipment 40 may use both of an OSI control signal and a GMPLS control signal for network monitoring and control.

Figure 2:
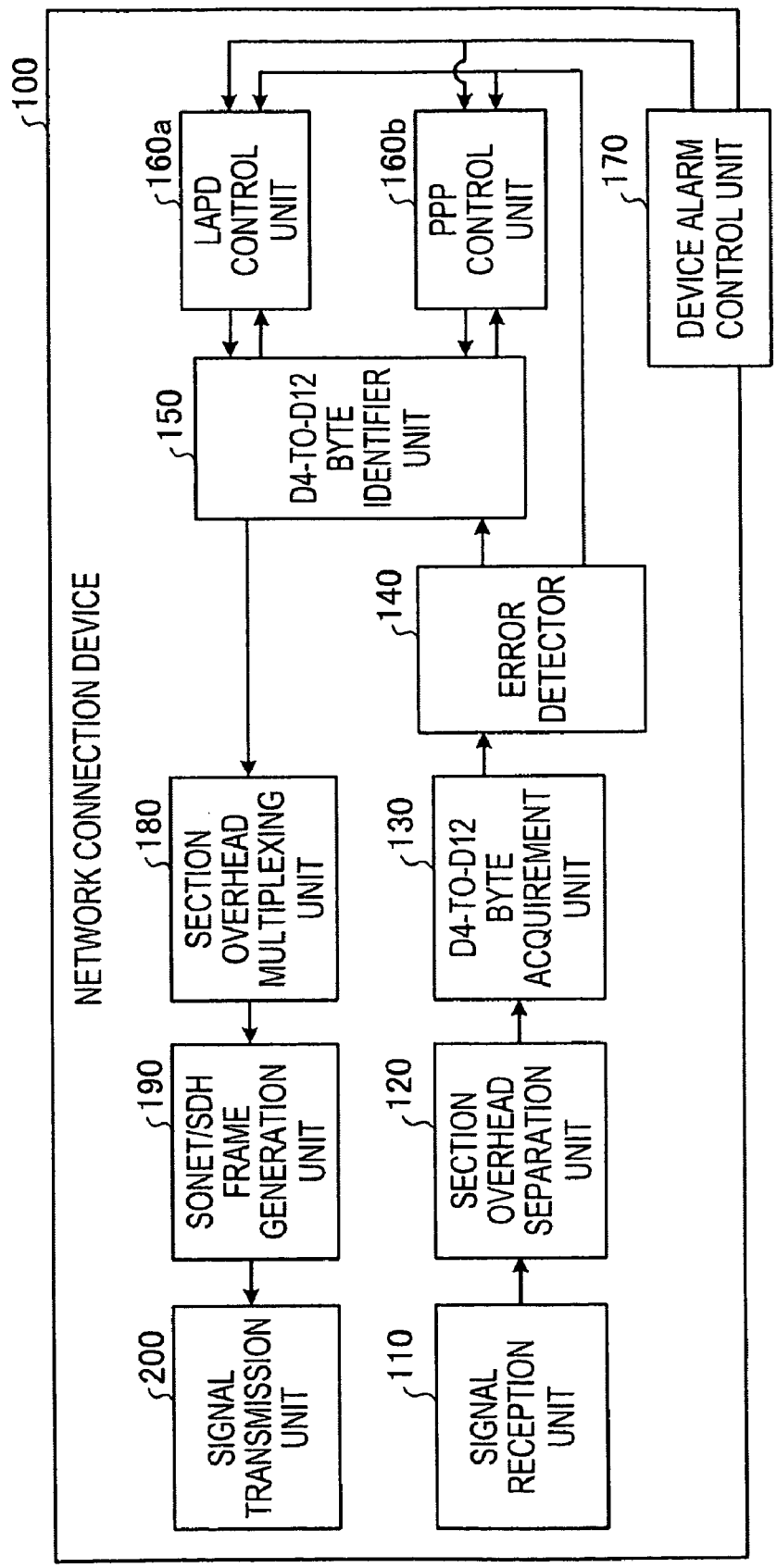
FIG. 2 is a block diagram showing the schematic configuration of a network connection device according to an embodiment of the present invention.

FIG. 2 is a block diagram showing the schematic configuration of a network connection device according to this embodiment. As shown in FIG. 2, a network connection device 100 includes a signal reception unit 110, a section overhead separation unit 120, a D4-to-D12 byte acquirement unit 130, and an error detector 140. The network connection device 100 also includes a D4-to-D12 byte identifier 150, a LAPD control unit 160a, a PPP control unit 160b, and a device alarm control unit 170. The network connection device 100 further includes a section overhead multiplexing unit 180, a SONET/SDH frame generation unit 190, and a signal transmission unit 200.

In the following explanation, a description of the units at the time of SONET/SDH frame reception and a description of the units at the time of SONET/SDH frame transmission will be separately given below. The description of the units at the time of SONET/SDH frame reception will be given first.

The signal reception unit 110 receives an optical signal (a SONET/SDH frame) transmitted from an opposing repeating device. The signal reception unit 110 subjects the received optical signal to electric conversion. The signal reception unit 110 then outputs the electric signal obtained after the conversion to the section overhead separation unit 120.

Figure 3:
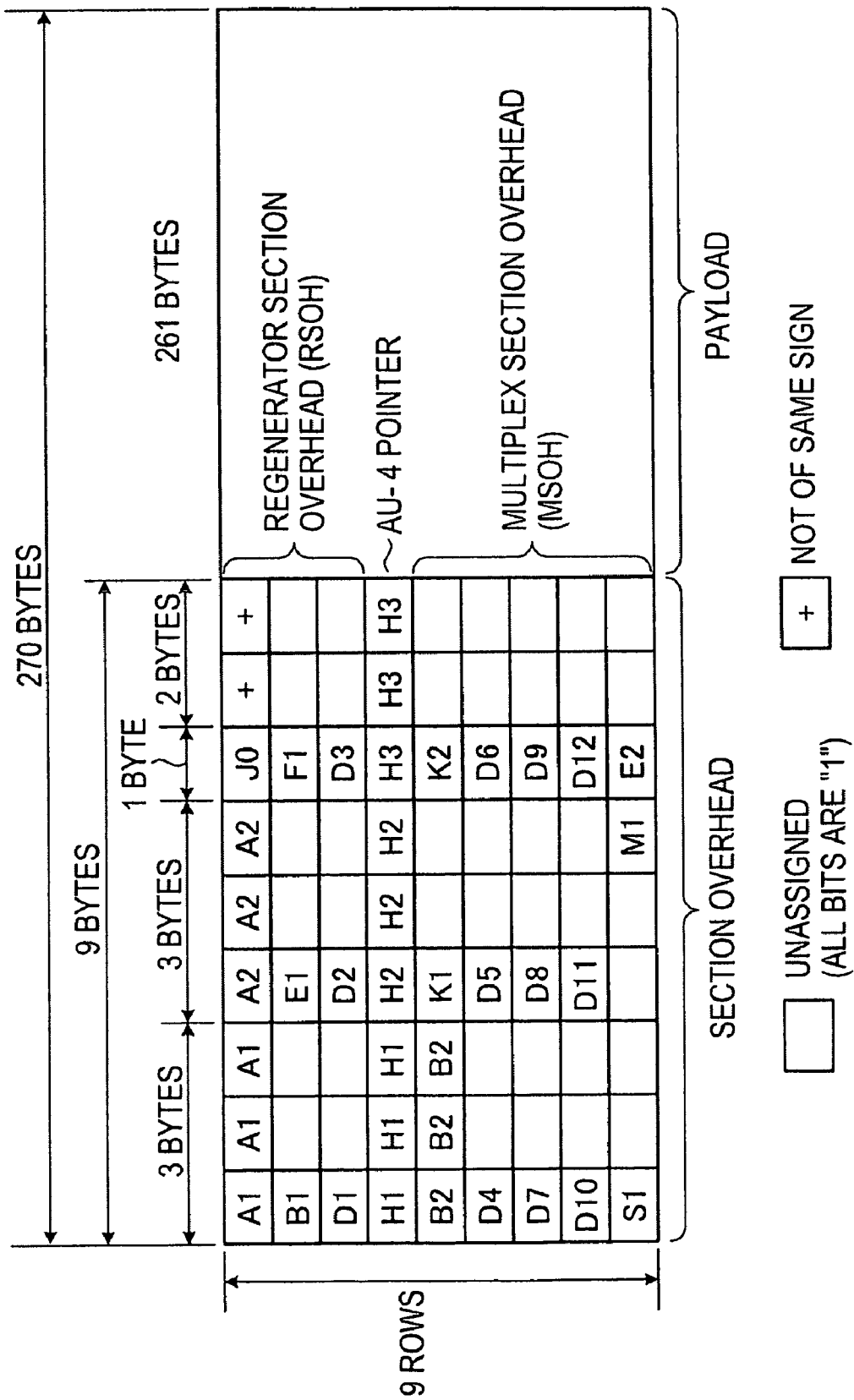
FIG. 3 is a diagram showing a SONET/SDH frame format.

A SONET/SDH frame to be received by the signal reception unit 110 will be concretely described with reference to FIG. 3. FIG. 3 is a diagram showing a SONET/SDH frame format.

In the network shown in FIG. 1, each repeating device transmits and receives a frame with 9 rows and 270 columns as shown in FIG. 3.

Nine rows by 9 columns at the top of a frame constitute a section overhead and serve as a header part of the frame. The first three rows in the section overhead constitute a Regenerator Section Overhead. The fourth row constitutes an AU-4 pointer. The last five rows constitute a Multiplex Section Overhead. The remaining 9 rows by 261 columns constitute a payload and serves as a region for storing information.

An OSI control signal (LAPD) or a GMPLS control signal (PPP) transmitted from the monitor and control equipment 40 is mapped to D4 to D12 bytes in the Multiplex Section Overhead.

Upon receipt of the frame from the signal reception unit 110, the section overhead separation unit 120 separates a section overhead from the frame. The section overhead separation unit 120 outputs the section overhead to the D4-to-D12 byte acquirement unit 130.

Upon receipt of the section overhead from the section overhead separation unit 120, the D4-to-D12 byte acquirement unit 130 acquires the D4 to D12 bytes from the section overhead. The D4-to-D12 byte acquirement unit 130 outputs the D4 to D12 bytes to the error detector 140.

Upon receipt of the D4 to D12 bytes from the D4-to-D12 byte acquirement unit 130, the error detector 140 performs error detection by performing a checksum test and the like on the D4 to D12 bytes. If an error is detected, the error detector 140 notifies the LAPD control unit 160a and PPP control unit 160b that the error was detected. After the error detection, the error detector 140 outputs the D4 to D12 bytes to the D4-to-D12 byte identifier 150.

When the D4-to-D12 byte identifier 150 receives the D4 to D12 bytes from the error detector 140 and acquires the value of a bit at a predetermined position of the D4 to D12 bytes, it identifies a protocol in the D4 to D12 bytes on the basis of the value.

A protocol identification method for the D4-to-D12 byte identifier 150 will be described with reference to FIGS. 4 and 5.

Figure 4:
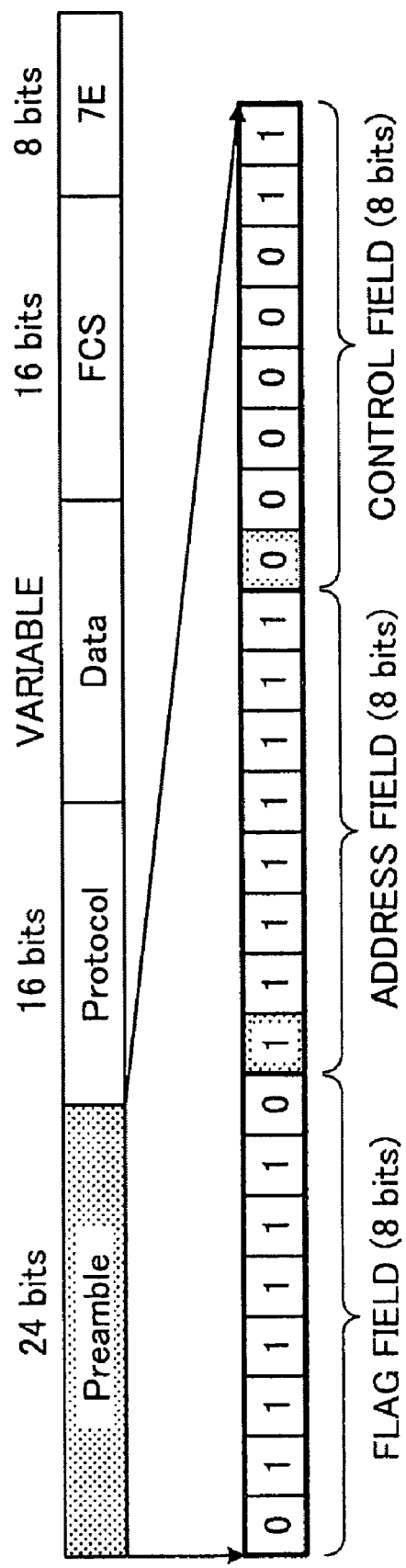
FIG. 4 is a diagram showing a frame format for the Point-to-Point Protocol (PPP)

FIG. 4 is a diagram showing a frame format for PPP. As shown in FIG. 4, if the monitor and control equipment 40 transmits a GMPLS control signal (PPP), the values of the ninth bit and the 17th bit in the bit sequence of the control signal are invariably "1" and "0", respectively.

Figure 5:
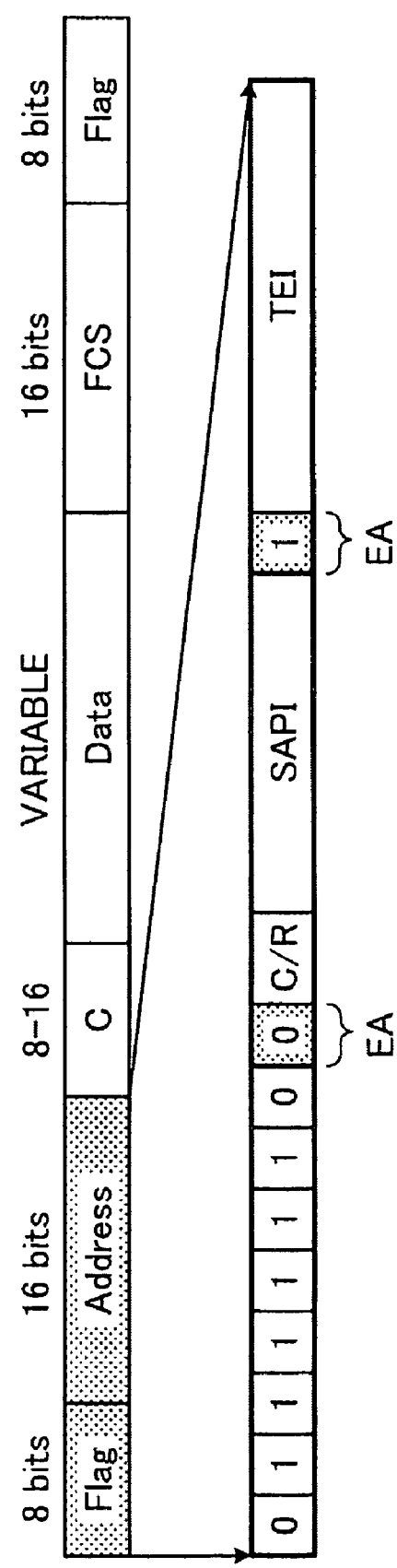
FIG. 5 is a diagram showing a frame format for the Link Access Procedure on the D-channel (LAPD)

FIG. 5 is a diagram showing a frame format for LAPD. As shown in FIG. 5, if the monitor and control equipment 40 transmits an OSI control signal (LAPD), the values of the ninth bit and the 17th bit in the bit sequence of the control signal are invariably "0" and "1", respectively.

The D4-to-D12 byte identifier 150 acquires the values of the ninth bit and the 17th bit in the bit sequence of the D4 to D12 bytes. If the values are "1" and "0" respectively, the D4-to-D12 byte identifier 150 judges that the protocol is PPP.

On the other hand, if the values are "0" and "1" respectively, the D4-to-D12 byte identifier 150 judges that the protocol is LAPD.

Figure 6:
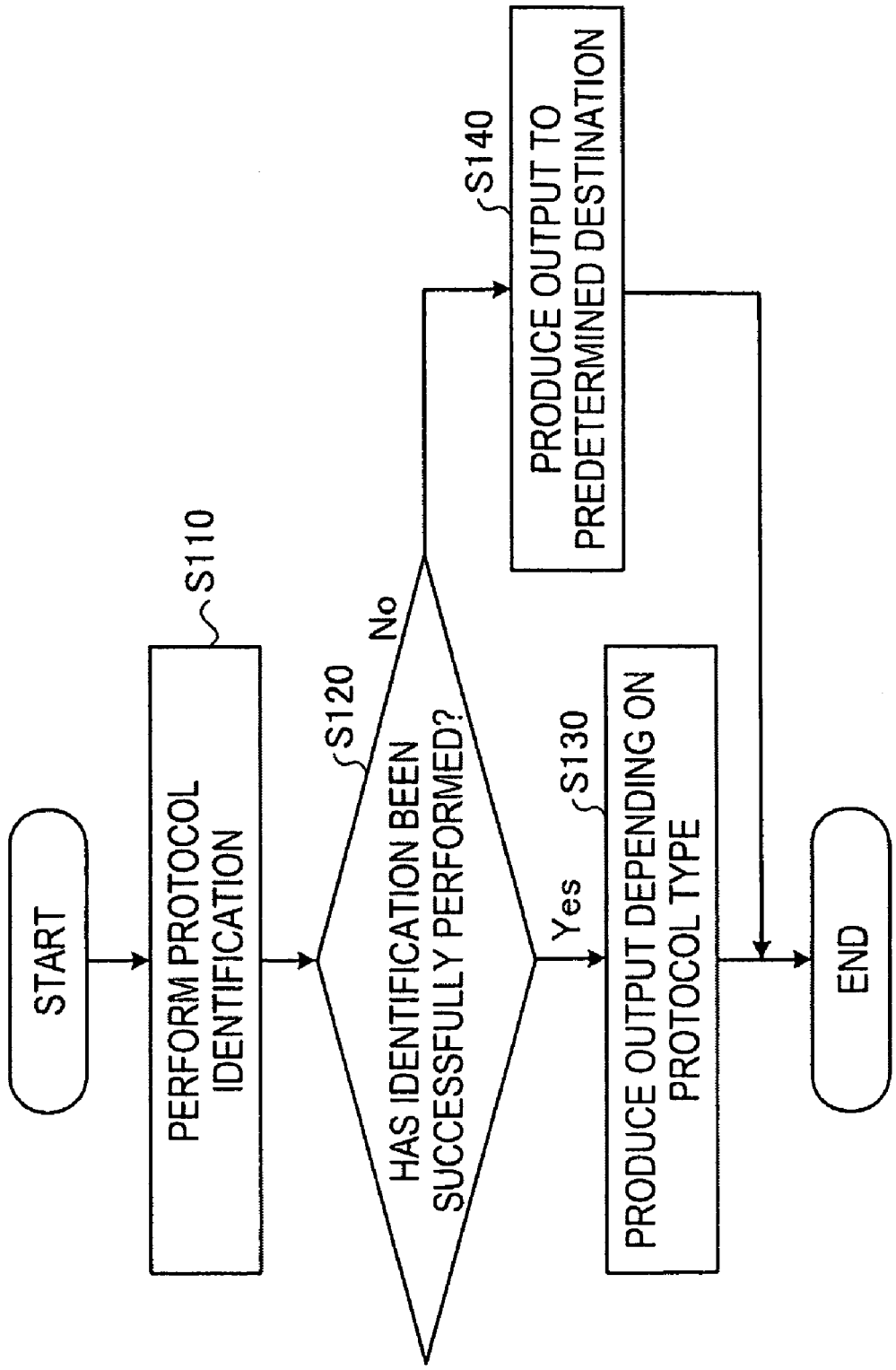
FIG. 6 is a flow chart for explaining a processing operation of a D4-to-D12 byte identifier 150.

A processing operation of the D4-to-D12 byte identifier 150 will be described with reference to FIG. 6. FIG. 6 is a flow chart for explaining the processing operation of the D4-to-D12 byte identifier 150. The process flow shown in FIG. 6 is repeatedly executed each time the D4-to-D12 byte identifier 150 receives D4 to D12 bytes from the error detector 140.

First, the D4-to-D12 byte identifier 150 performs protocol identification on received D4 to D12 bytes (operation S110). If the identification has been successfully performed (YES in operation S120), the D4-to-D12 byte identifier 150 outputs the D4 to D12 bytes to a destination appropriate to the type of the protocol (operation S130).

Note that the D4-to-D12 byte identifier 150 outputs the D4 to D12 bytes to the LAPD control unit 160a if a protocol in the D4 to D12 bytes is LAPD and outputs the D4 to D12 bytes to the PPP control unit 160b if the protocol in the D4 to D12 bytes is PPP.

On the other hand, if the identification has been unsuccessfully performed (NO in operation S120), the D4-to-D12 byte identifier 150 outputs the D4 to D12 bytes to a predetermined destination (operation S140) and ends the process.

Note that the destination for the case of unsuccessful identification may be arbitrarily set. For example, either the LAPD control unit 160a or the PPP control unit 160b may be set as the destination. Alternatively, both the LAPD control unit 160a and the PPP control unit 160b may be set as the destination.

The LAPD control unit 160a interprets the D4 to D12 bytes received from the D4-to-D12 byte identifier 150 according to LAPD and performs processing.

The PPP control unit 160b interprets the D4 to D12 bytes received from the D4-to-D12 byte identifier 150 according to PPP and performs processing.

The device alarm control unit 170 monitors the network connection device for a failure. When the device alarm control unit 170 detects any failure, it notifies the LAPD control unit 160a and PPP control unit 160b of the failure.

Figure 7:
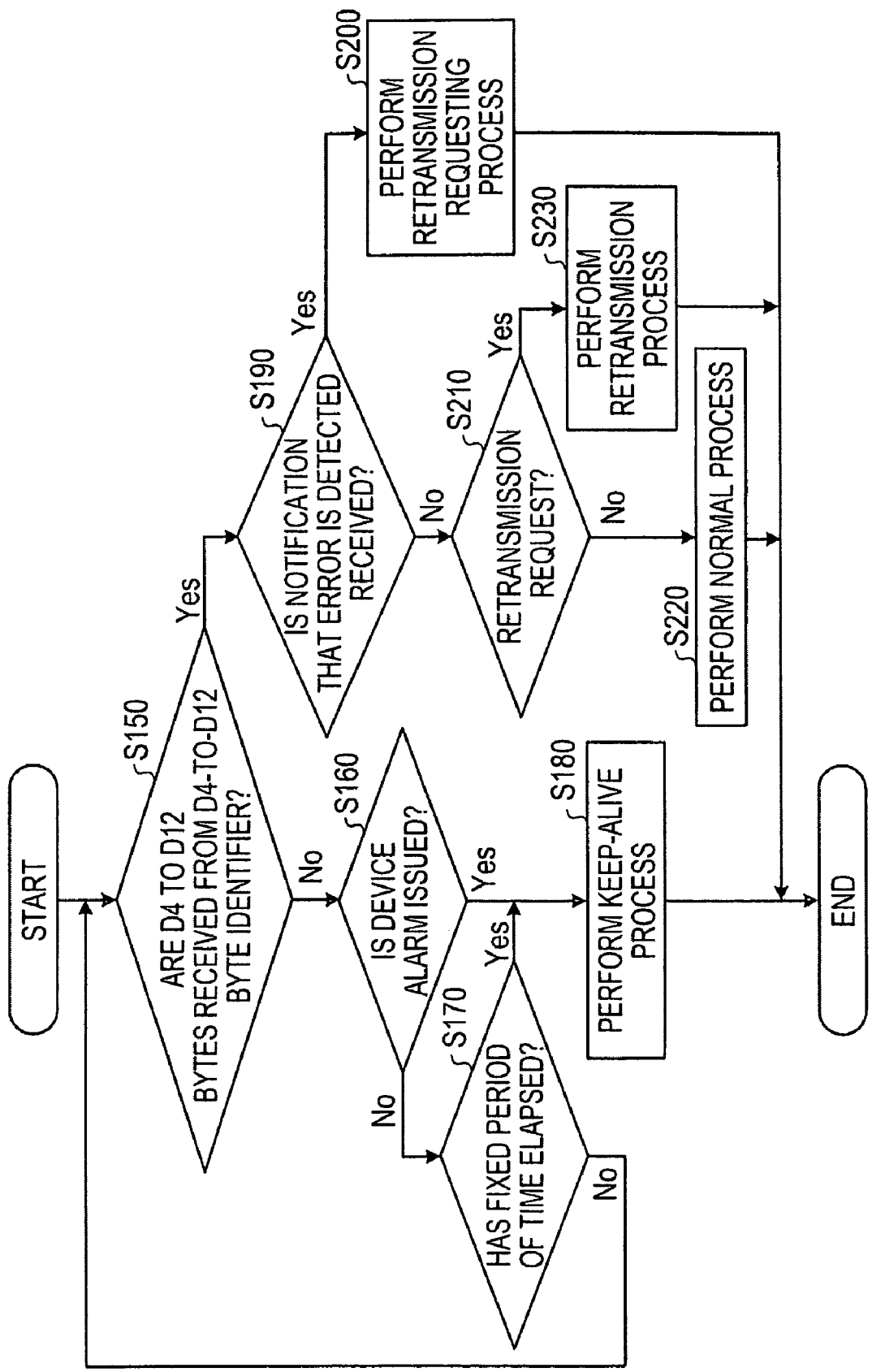

A processing operation of the LAPD control unit 160a will be described with reference to FIG. 7. FIG. 7 is a flow chart for explaining the processing operation of the LAPD control unit 160a. The process flow shown in FIG. 7 is repeatedly executed while the network connection device 100 is operating. Note that since a processing operation of the PPP control unit 160b is the same as the processing operation of the LAPD control unit 160a to be described below, a description thereof will be omitted.

If the LAPD control unit 160a, having received a notification from the error detector 140, receives D4 to D12 bytes from the D4-to-D12 byte identifier 150 (YES in operation S150 and YES in operation S190), it performs a retransmission requesting process (operation S200).

If the LAPD control unit 160a, not having received a notification from the error detector 140, receives the D4 to D12 bytes from the D4-to-D12 byte identifier 150 (YES in operation S150 and NO in operation S190), it interprets the D4 to D12 bytes according to LAPD. If the D4 to D12 bytes indicate that a received frame is a retransmission request (YES in operation S210), the LAPD control unit 160a makes a retransmission to a partner which has made the retransmission request (operation S230). On the other hand, if the received frame is not a retransmission request (NO in operation S210), the LAPD control unit 160a performs a normal process such as outputting the D4 to D12 bytes to a main control unit of a repeating device equipped with the network connection device (operation S220).

Referring back to operation S150, if the LAPD control unit 160a has not received D4 to D12 bytes from the D4-to-D12 byte identifier 150 after a certain period of time (NO in operation S150, NO in operation S160, and YES in operation S170), it performs a keep-alive process to maintain communication with an opposing repeating device (operation S180).

When the LAPD control unit 160a receives a notification from the device alarm control unit 170 (NO in operation S150 and YES in operation S160), the LAPD control unit 160a immediately performs the keep-alive process (operation S180) even if the certain period of time has not elapsed. For example, the LAPD control unit 160a makes a retransmission request in response to the retransmission request not after the certain period of time but immediately after a notification from the device alarm control unit 170, which has detected the failure, even if a retransmission to a partner which has made a retransmission request cannot be made due to some failure in the network connection device.

The description of the units at the time of SONET/SDH frame transmission will be given.

The LAPD control unit 160a creates a LAPD frame using information to be transmitted which is inputted from the main control unit of the repeating device (not shown) in accordance with the frame format for LAPD.

The PPP control unit 160b creates a PPP frame using information to be transmitted which is inputted from the main control unit of the repeating device (not shown) in accordance with the frame format for PPP.

The D4-to-D12 byte identifier 150 creates information for D4 to D12 bytes in accordance with the SONET/SDH frame format from the frame received from the LAPD control unit 160a or the frame received from the PPP control unit 160b depending on a result of the protocol type identification in operation S130 of FIG. 6.

The section overhead multiplexing unit 180 multiplexes the information for D4 to D12 bytes received from the D4-to-D12 byte identifier 150 into a section overhead.

The SONET/SDH frame generation unit 190 generates a SONET/SDH frame using the section overhead received from the section overhead multiplexing unit 180.

The signal transmission unit 200 outputs, as an optical signal, the SONET/SDH frame generated by the SONET/SDH frame generation unit 190.

As described above, according to the first embodiment, the network connection device 100 identifies a protocol of a control signal transmitted from the monitor and control equipment 40 and processes the control signal by the LAPD control unit 160a or PPP control unit 160b depending on the type of the protocol.

Since transmission devices constituting a SONET/SDH communication network are each equipped with the network connection device 100, it is possible to manage the whole network in a centralized manner by the same piece of monitor and control equipment. Additionally, cumbersome work such as setting an OSI tunnel is unnecessary for the management.

Second Embodiment

Figure 8:
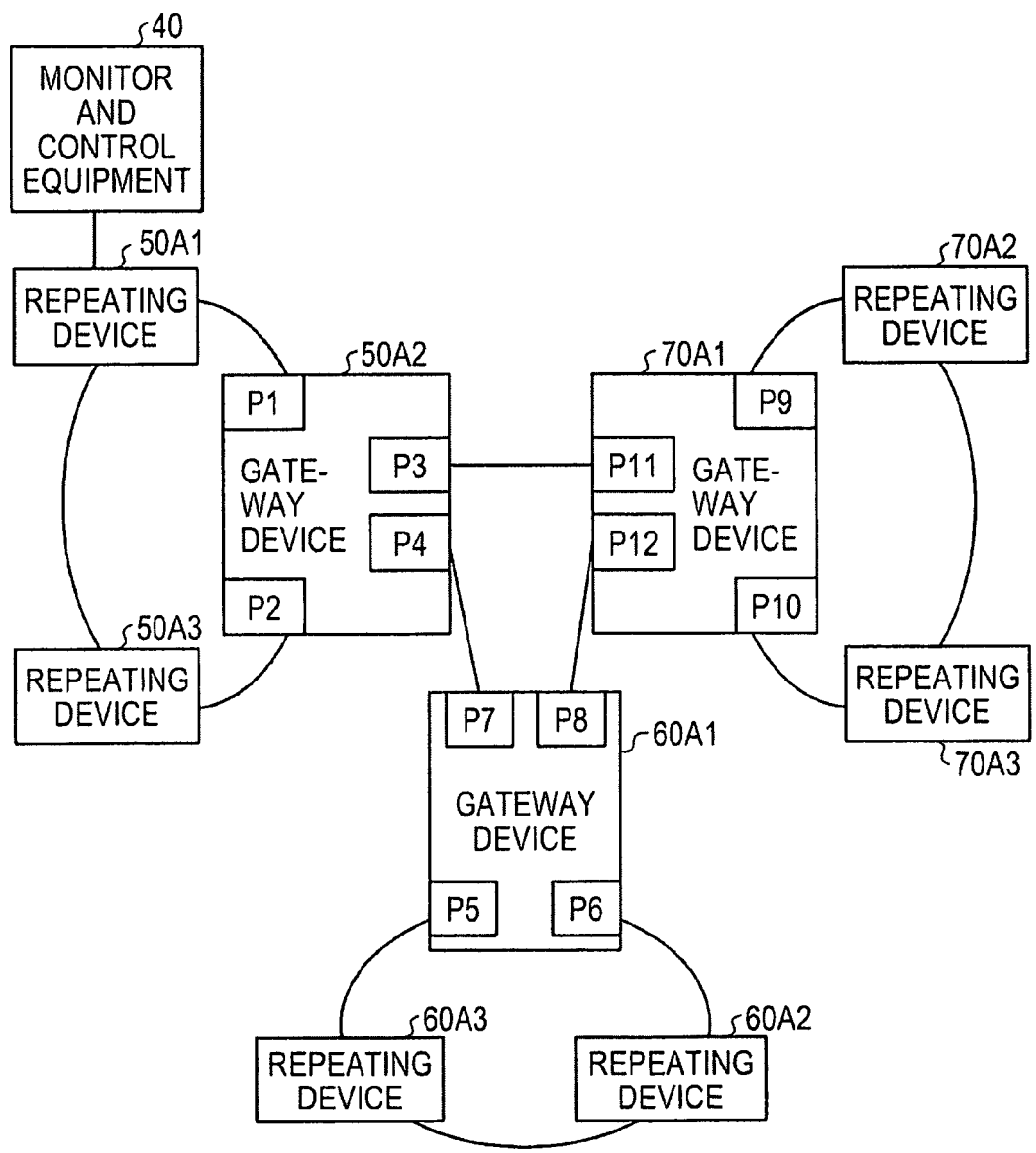
FIG. 8 is a diagram showing an example of a network serving as an object to be monitored and controlled.

FIG. 8 is a diagram showing an example of a network serving as an object to be monitored and controlled. As shown in FIG. 8, the network includes networks to be described below. A first network includes a repeating device 50A1, a gateway device 50A2, and a repeating device 50A3. A second network includes a gateway device 60A1, a repeating device 60A2, and a repeating device 60A3. A third network includes a gateway device 70A1, a repeating device 70A2, and a repeating device 70A3. The first, second, and third networks are connected to one another.

More specifically, the repeating device 50A1, repeating device 50A3, gateway device 70A1, and gateway device 60A1 are connected to ports P1 to P4, respectively, of the gateway device 50A2.

The repeating device 60A3, repeating device 60A2, gateway device 50A2, and gateway device 70A1 are connected to ports P5 to P8, respectively, of the gateway device 60A1.

The repeating device 70A2, repeating device 70A3, gateway device 50A2, and gateway device 60A1 are connected to ports P9 to P12, respectively, of the gateway device 70A1.

The above-described first to third networks are each a network constructed in conformity with SONET/SDH. The first network supports GMPLS while the second and third networks support OSI.

Accordingly, a TCP/IP protocol is used for communication among the devices 50A1 to 50A3 while an OSI protocol is used for communication among the devices 60A1 to 60A3 and communication among the devices 70A1 to 70A3.

The gateway device 50A2, gateway device 60A1, and gateway device 70A1 described above are gateway devices according to this embodiment. It is possible to manage the whole network in a centralized manner by one piece of monitor and control equipment 40.

Note that a second embodiment is different from the first embodiment in that the monitor and control equipment 40 needs to use a control signal in a protocol used by a repeating device to which the monitor and control equipment 40 is connected for network monitoring and control. That is, the monitor and control equipment 40 uses a GMPLS control signal (PPP) in FIG. 8.

Figure 9:
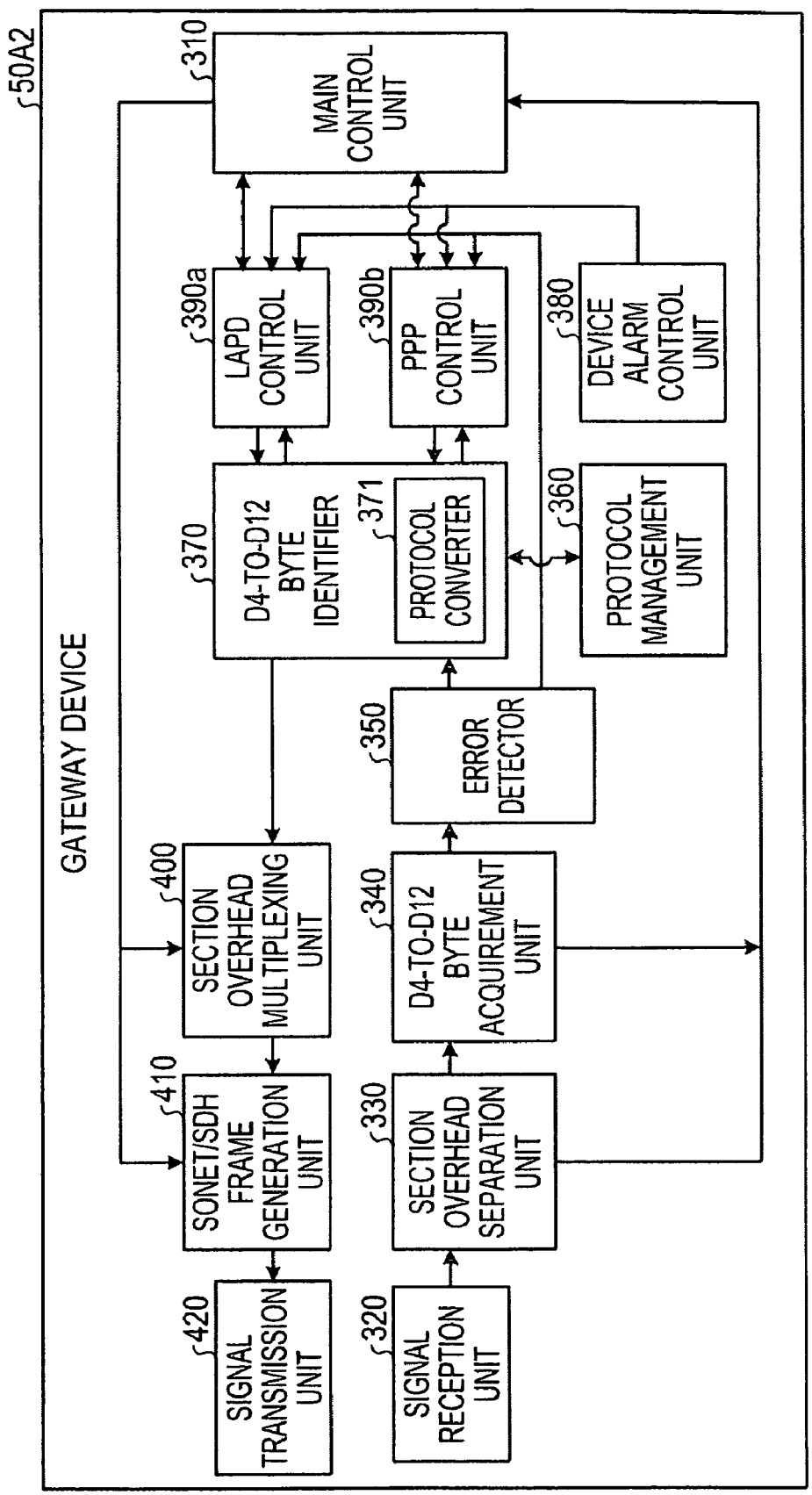
FIG. 9 is a block diagram showing the schematic configuration of a gateway device according to another embodiment of the present invention.

FIG. 9 is a block diagram showing the schematic configuration of a gateway device according to this embodiment. Note that the gateway device 50A2 shown in FIG. 8 will be described as a representative example.

As shown in FIG. 9, the gateway device 50A2 includes a main control unit 310, a signal reception unit 320, a section overhead separation unit 330, and a D4-to-D12 byte acquirement unit 340. The gateway device 50A2 also includes an error detector 350, a protocol management unit 360, and a D4-to-D12 byte identifier 370. The gateway device 50A2 further includes a LAPD control unit 390a, a PPP control unit 390b, a device alarm control unit 380, a section overhead multiplexing unit 400, a SONET/SDH frame generation unit 410, and a signal transmission unit 420.

The main control unit 310 is a processor which performs overall control of the gateway device 50A2 and performs information processing on a payload and a section overhead.

In the following explanation, a description of the units at the time of frame reception and a description of the units at the time of frame transmission will be separately given below. The description of the units at the time of frame reception will be given first.

The signal reception unit 320 receives an optical signal transmitted from an opposing repeating device, subjects the received optical signal to electric conversion, and then outputs the resultant signal to the section overhead separation unit 330.

Upon receipt of a frame from the signal reception unit 320, the section overhead separation unit 330 separates the frame into a section overhead and a payload. The section overhead separation unit 330 outputs the section overhead to the D4-to-D12 byte acquirement unit 340 and outputs the payload to the main control unit 310.

Upon receipt of the section overhead from the section overhead separation unit 330, the D4-to-D12 byte acquirement unit 340 acquires D4 to D12 bytes from the section overhead. The D4-to-D12 byte acquirement unit 340 outputs the D4 to D12 bytes to the error detector 350 and outputs the section overhead except for the D4 to D12 bytes to the main control unit 310.

Upon receipt of the D4 to D12 bytes from the D4-to-D12 byte acquirement unit 340, the error detector 350 performs error detection by performing a checksum test and the like on the D4 to D12 bytes. If an error is detected, the error detector 350 notifies the LAPD control unit 390a and PPP control unit 390b that the error was detected. After the error detection, the error detector 350 outputs the D4 to D12 bytes to the D4-to-D12 byte identifier 370.

The protocol management unit 360 stores the type of the protocol used for communication with a repeating device connected to the gateway device 50A2.

More specifically, the protocol management unit 360 stores a port and a protocol type in association with each other, as shown in a table of the gateway device 50A2 in FIG. 10.

When the D4-to-D12 byte identifier 370 receives the D4 to D12 bytes from the error detector 350 and acquires the value of a bit at a predetermined position of the D4 to D12 bytes, it identifies a protocol in the D4 to D12 bytes on the basis of the value. Note that a protocol identification method is as described in the first embodiment.

Figure 11:
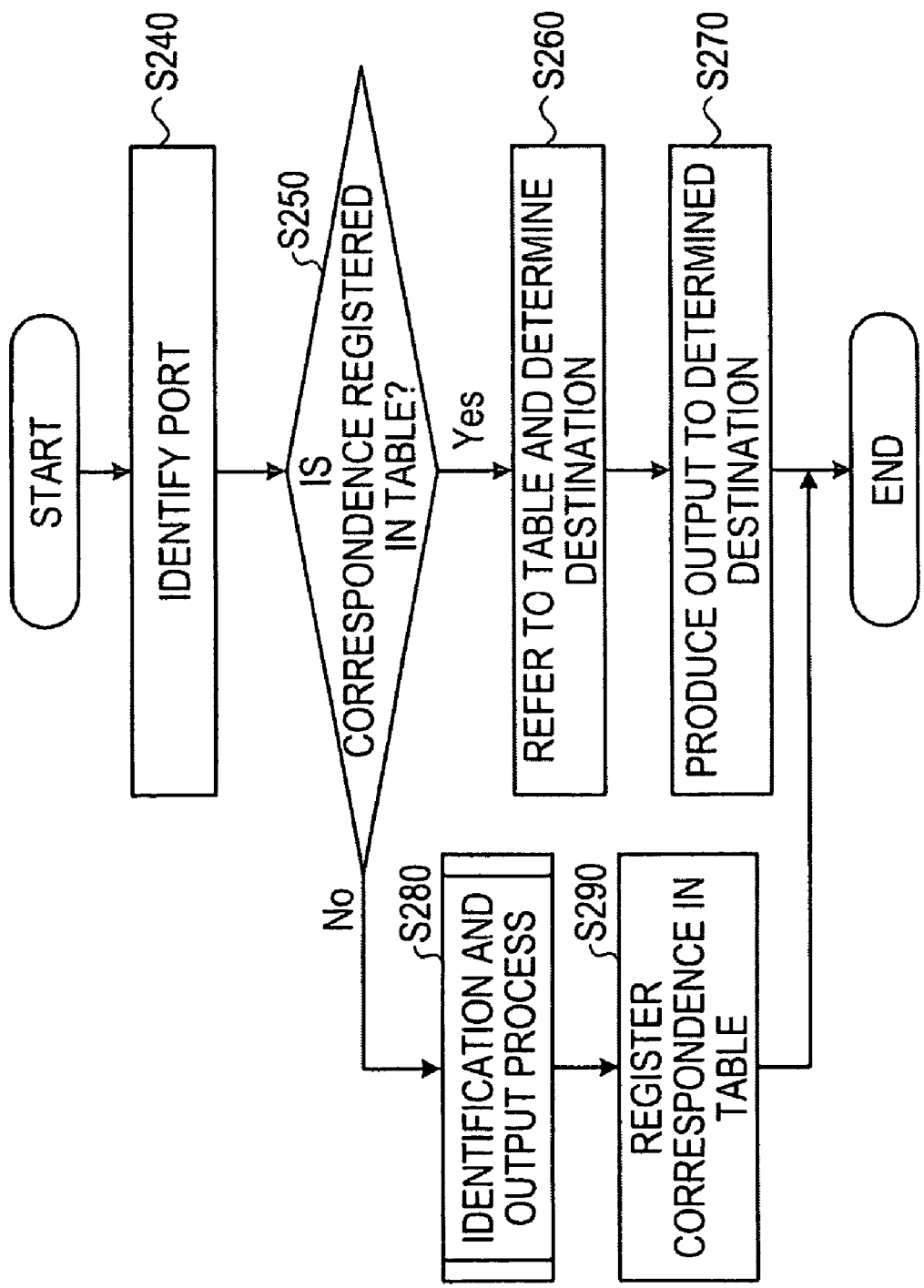
FIG. 11 is a flow chart for explaining a processing operation of a D4-to-D12 byte identifier 370.

A processing operation of the D4-to-D12 byte identifier 370 will be described with reference to FIG. 11. FIG. 11 is a flow chart for explaining the processing operation of the D4-to-D12 byte identifier 370. The process flow shown in FIG. 11 is repeatedly executed each time the D4-to-D12 byte identifier 370 receives D4 to D12 bytes from the error detector 350.

The D4-to-D12 byte identifier 370 judges through which port the received D4 to D12 bytes are inputted (operation S240).

The D4-to-D12 byte identifier 370 searches the protocol management unit 360 (operation S250) to see whether a correspondence between the port and a protocol type is registered. If the correspondence is already registered (YES in operation S250), the D4-to-D12 byte identifier 370 determines a destination depending on a protocol type associated with the port (operation S260) and outputs the D4 to D12 bytes to the destination (operation S270).

Note that the D4-to-D12 byte identifier 370 outputs the D4 to D12 bytes to the LAPD control unit 390a if the protocol type is LAPD and outputs the D4 to D12 bytes to the PPP control unit 390b if the protocol type is PPP.

Referring back to operation S250, if the correspondence between the port and a protocol type is not registered (NO in operation S250), the D4-to-D12 byte identifier 370 performs an identification and output process indicated by operations S110 to S140 in FIG. 6 (operation S280). After that, the D4-to-D12 byte identifier 370 registers the correspondence between the port and a protocol type in the protocol management unit 360 (operation S290) only if the protocol identification has been successfully performed and ends the process.

The LAPD control unit 390a interprets the D4 to D12 bytes received from the D4-to-D12 byte identifier 370 according to LAPD and performs processing.

The PPP control unit 390b interprets the D4 to D12 bytes received from the D4-to-D12 byte identifier 370 according to PPP and performs processing.

Note that concrete processing operations of the LAPD control unit 390a and PPP control unit 390b are as described with reference to FIG. 7 in the first embodiment, and a description thereof will be omitted.

The device alarm control unit 380 constantly monitors the gateway device for a failure. When the device alarm control unit 380 detects any failure, it notifies the LAPD control unit 390a and PPP control unit 390b of the failure.

The description of the units at the time of frame transmission will be given. The LAPD control unit 390a creates a frame using information to be transmitted which is inputted from the main control unit 310 in accordance with a frame format for LAPD.

The PPP control unit 390b creates a frame using information to be transmitted which is inputted from the main control unit 310 in accordance with a frame format for PPP.

Upon receipt of the frame from the LAPD control unit 390a or PPP control unit 390b, the D4-to-D12 byte identifier 370 recreates a frame by a protocol converter 371 if protocol conversion is necessary. The D4-to-D12 byte identifier 370 creates, from the frame, information for D4 to D12 bytes in accordance with a SONET/SDH frame format.

Figure 12:
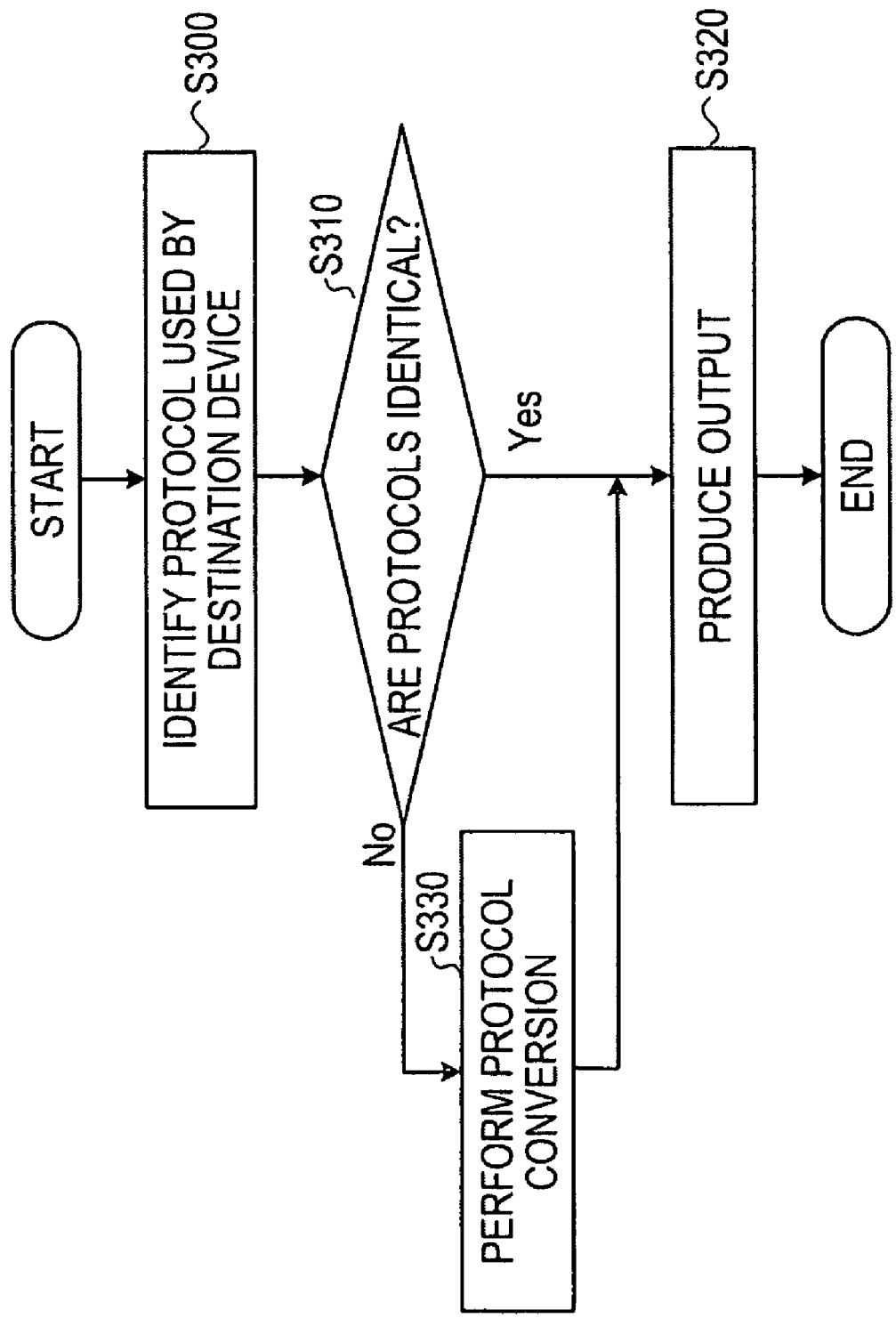
FIG. 12 is a flow chart for explaining a processing operation of the D4-to-D12 byte identifier 370.

A processing operation of the D4-to-D12 byte identifier 370 will be described with reference to FIG. 12. FIG. 12 is a flow chart for explaining the processing operation of the D4-to-D12 byte identifier 370. The process flow shown in FIG. 12 is repeatedly executed each time the D4-to-D12 byte identifier 370 receives a frame from the LAPD control unit 390a or PPP control unit 390b.

First, the D4-to-D12 byte identifier 370 judges through which port a received frame is to be outputted. The D4-to-D12 byte identifier 370 refers to a correspondence stored by the protocol management unit 360, and identifies a protocol used by a destination device (operation S300).

If the protocol of the received frame and the protocol as a result of the identification are identical (YES in operation S310), the D4-to-D12 byte identifier 370 creates information for D4 to D12 bytes from the received frame and outputs the D4 to D12 bytes to the section overhead multiplexing unit 400 (operation S320).

On the other hand, if the protocol of the received frame and the protocol as the determination result are different (NO in operation S310), the D4-to-D12 byte identifier 370 recreates a frame in the protocol as the determination result by the protocol converter 371 (operation S330).

The D4-to-D12 byte identifier 370 creates the information for D4 to D12 bytes from the frame, outputs the information to the section overhead multiplexing unit 400 (operation S320), and ends the process.

A failure may occur in the network, and a transfer path for a SONET/SDH frame may be changed.

Figure 13:
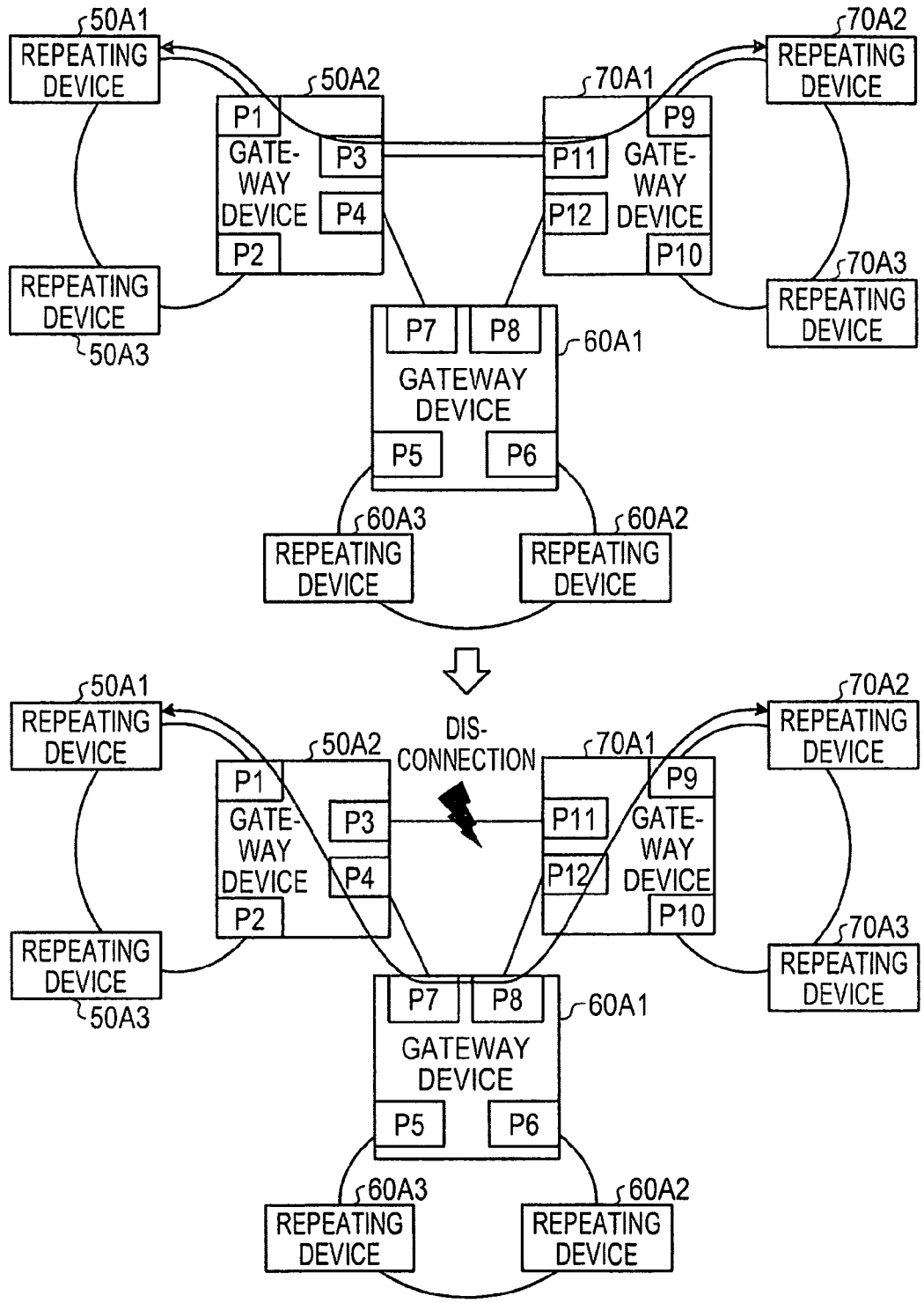
FIG. 13 is a diagram showing a network with a disconnection.

For example, as shown in FIG. 13, the transfer path between the repeating device 50A1 and the repeating device 70A2 may be changed from a normal transfer path (a path indicated by an arrow in a network on the upper side in FIG. 13) (to a path indicated by an arrow in a network on the lower side in FIG. 13) due to a disconnection.

Even if correspondences between ports and protocol types as shown in FIG. 10 are stored in the protocol management unit in each gateway device in advance of the occurrence of the disconnection, the disconnection does not cause a change in the contents of a table storing the correspondences.

Even after the occurrence of the disconnection, the D4-to-D12 byte identifier of each gateway device likewise judges through which port a received frame is to be outputted. The D4-to-D12 byte identifier refers to the correspondences stored by the protocol management unit and identifies a protocol used by a destination device. If protocol conversion is necessary, the protocol converter recreates a frame.

Accordingly, even if a SONET/SDH frame is transferred through the path after the occurrence of the disconnection, the gateway device 50A2 converts the D4 to D12 bytes of a frame from a protocol in the D4 to D12 bytes to the protocol used for communication with the repeating device 50A1, to which the port P1 is connected, PPP, as before.

The gateway device 70A1 converts D4 to D12 bytes of a frame from a protocol in the D4 to D12 bytes to the protocol used for communication with the repeating device 70A2, to which the port P9 is connected, LAPD, as before.

Consequently, even if a disconnection occurs, communication between the repeating device 50A1 and the repeating device 70A2 can be established.

The section overhead multiplexing unit 400 multiplexes the information for D4 to D12 bytes received from the D4-to-D12 byte identifier 370 into a section overhead except for information for D4 to D12 bytes received from the main control unit 310.

The SONET/SDH frame generation unit 410 adds the section overhead received from the section overhead multiplexing unit 400 to a payload received from the main control unit 310, thereby generating a SONET/SDH frame.

The signal transmission unit 420 outputs, as an optical signal, the SONET/SDH frame generated by the SONET/SDH frame generation unit 410.

As described above, according to the second embodiment, each time the gateway device receives a control signal, it identifies the type of a protocol of the control signal and registers the protocol type in the protocol management unit. The gateway device processes the control signal by the LAPD control unit or PPP control unit depending on the protocol type determined by identification or a search of the protocol management unit. When a control signal is to be transmitted, the control signal is converted from the protocol of the control signal to a protocol used by a destination device, if necessary.

Installment of the gateway device for each network group in which a common protocol is used in a SONET/SDH communication network makes it possible to manage the whole network in a centralized manner by the same piece of monitor and control equipment. Additionally, cumbersome work such as setting an OSI tunnel is unnecessary for the management.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A network connection device for performing a process of transmitting and receiving a SONET/SDH frame, comprising:
 a first protocol processor which processes a first layer 2 protocol for network management;
 a second protocol processor which processes a second layer 2 protocol for network management;
 a frame header extractor which extracts a header from the received SONET/SDH frame; and a protocol identifier which identifies a layer 2 protocol for network management based on the extracted frame header, selects one of a control signal outputted from the first protocol processor and a control signal outputted from the second protocol processor based on a result of the identification, and outputs the control signal, wherein the protocol identifier judges, based on a bit at a predetermined position of the extracted frame header, whether the layer 2 protocol for network management is LAPD or PPP with terminating layer 2.

2. The network connection device according to claim 1, wherein the first layer 2 protocol for network management is the Link Access Procedure on the D-channel (LAPD), and the second layer 2 protocol for network management is the Point-to-Point Protocol (PPP).

3. The network connection device according to claim 2, further comprising an error detector which detects whether there is an error in the control signal and, if an error is detected, issues a notification requesting a retransmission request to one of the LAPD processor and the PPP processor, from which the selected control signal is outputted, wherein the LAPD processor and PPP processor make a retransmission request upon receipt of a notification from the error detector.

4. The network connection device according to claim 2, further comprising a failure detector which detects a failure in the network connection device and notifies the LAPD processor and/or the PPP processor, wherein the LAPD processor and/or the PPP processor immediately performs a process to be performed at a next keep-alive point upon receipt of a notification from the error detector.

5. A network connection device for performing a process of transmitting and receiving a SONET/SDH frame, comprising:

a LAPD processor which uses LAPD for processing on a control signal which is mapped to a SDCC of the SONET/SDH frame;

a PPP processor which uses PPP for processing on the control signal which is mapped to the SDCC of the SONET/SDH frame;

a protocol storage which accepts registration of a protocol used by a transmission device connected to the network connection device and stores a corresponding protocol for each of ports; and an identifier which, at the time of reception of the control signal, refers to the protocol storage, judges whether a protocol is registered for a port through which the control signal is inputted, outputs the control signal to the LAPD processor or the PPP processor depending on the type of the protocol registered if the protocol is registered, and identifies the type of the protocol based on a value of a bit at a predetermined position of the control signal and outputs the control signal to the LAPD processor or the PPP processor depending on a result of the identification if the protocol is not registered, wherein the identifier judges, based on the value of the bit at the predetermined position of the control signal, whether the layer 2 protocol for network management of is LAPD or PPP with terminating layer 2.

6. The network connection device according to claim 5, further comprising:

a register which registers, in the protocol storage, the type of the protocol of the control signal identified by the identifier as a protocol corresponding to the port through which the control signal is inputted; and a converter which, at the time of transmission of the control signal, searches the protocol storage for a protocol corresponding to a port through which the control signal is to be outputted and, if the protocol is different from a protocol of the control signal when the control signal is received, converts the control signal from the protocol of the control signal to the protocol as a result of the search.

7. A signal processing method for a control signal which is mapped to a SDCC of a SONET/SDH frame in a network connection device for performing a process of transmitting and receiving the SONET/SDH frame, comprising:

processing a first layer 2 protocol for network management;

processing a second layer 2 protocol for network management;

extracting a header from the received SONET/SDH frame;

identifying a layer 2 protocol for network management based on the extracted frame header;

judging, based on a value of a bit at a predetermined position of the control signal, whether the layer 2 protocol for network management is LAPD or PPP with terminating layer 2;

selecting one of a control signal obtained in the first layer 2 protocol for network management processing and a control signal obtained in the second layer 2 protocol for network management processing based on a result of the judging; and outputting the control signal.

8. The signal processing method according to claim 7, further comprising:

performing processing on a control signal whose type of the protocol is identified as LAPD using LAPD; and performing processing on a control signal whose type of the protocol is identified as PPP using PPP.

9. The signal processing method according to claim 7, further comprising:

referring to a predetermined storage at the time of reception of the control signal;

judging whether a protocol is registered for a port through which the control signal is inputted;

determining the protocol as the type of the protocol of the control signal if the protocol is registered;

registering the type of the protocol in the predetermined storage as a result of the identification as a protocol corresponding to a port through which the control signal serving as an object of identification is inputted if the protocol is identified in the protocol determining and identifying;

performing processing using LAPD on a control signal whose type of the protocol is determined or identified as LAPD in the protocol determining and identifying;

performing processing using PPP on a control signal whose type of the protocol is determined or identified as PPP in the protocol determining and identifying; and searching the predetermined storage for a protocol corresponding to a port through which the control signal is to be outputted at the time of transmission of the control signal; and converting the control signal from the protocol of the control signal to the protocol as a result of the search if the protocol is different from a protocol of the control signal when the control signal is received.

* * * * *

UNITED STATES PATENT AND TRADEMARK OFFICE
CERTIFICATE OF CORRECTION

PATENT NO. : 8,228,788 B2
APPLICATION NO. : 12/411868
DATED : July 24, 2012
INVENTOR(S) : Katsuhiro Shirai et al.

It is certified that error appears in the above-identified patent and that said Letters Patent is hereby corrected as shown below:

Column 11, Line 62-63, In Claim 5, delete "of is" and insert -- is --, therefor.

Signed and Sealed this
Sixteenth Day of October, 2012

David J. Kappos
*Director of the United States Patent and Trademark Office*